(12) United States Patent
Sae-Chim et al.

(10) Patent No.: US 9,047,013 B2
(45) Date of Patent: Jun. 2, 2015

(54) AVIONIC DATA DICTIONARY BASED MESSAGING SYSTEM AND METHOD

(75) Inventors: Prapon Sae-Chim, Bellevue, WA (US); Thomas F. McGuffin, Bellevue, WA (US); Patrick Ludwig, Renton, WA (US)

(73) Assignee: Honeywell International Inc., Morristown, NJ (US)

(*) Notice: Subject to any disclaimer, the term of this patent is extended or adjusted under 35 U.S.C. 154(b) by 743 days.

(21) Appl. No.: 12/873,591

(22) Filed: Sep. 1, 2010

(65) Prior Publication Data

US 2012/0054641 A1    Mar. 1, 2012

(51) Int. Cl.
  G06F 3/048    (2013.01)
  G06F 3/0489    (2013.01)
  G06F 17/27    (2006.01)
  G08G 5/00    (2006.01)

(52) U.S. Cl.
  CPC ............ *G06F 3/0489* (2013.01); *G06F 17/276* (2013.01); *G08G 5/0013* (2013.01); *G08G 5/0021* (2013.01)

(58) Field of Classification Search
  None
  See application file for complete search history.

(56) References Cited

U.S. PATENT DOCUMENTS

| | | |
|---|---|---|
| 5,072,395 A | 12/1991 | Bliss et al. |
| 5,797,098 A | 8/1998 | Schroeder et al. |
| 5,805,911 A | 9/1998 | Miller |
| 5,896,321 A | 4/1999 | Miller et al. |
| 6,134,532 A | 10/2000 | Lazarus et al. |
| 6,256,633 B1 | 7/2001 | Dharap |
| 6,346,892 B1 | 2/2002 | DeMers et al. |
| 6,377,965 B1 | 4/2002 | Hachamovitch et al. |
| 6,542,796 B1 * | 4/2003 | Gibbs et al. ...................... 701/3 |
| 6,731,701 B2 | 5/2004 | Vorobiev et al. |
| 6,856,864 B1 | 2/2005 | Gibbs et al. |

(Continued)

FOREIGN PATENT DOCUMENTS

| | | |
|---|---|---|
| EP | 2088536 | 8/2009 |
| JP | 2001265493 | 9/2001 |

OTHER PUBLICATIONS

Kaplan et al., "Adaptive Hypertext Navigation Based on User Goals and Context", "User Modeling and User-Adapted Interaction", 1993, pp. 193-220, vol. 3, Publisher: Kluwer Academic Publishers, Published in: Netherlands.

(Continued)

*Primary Examiner* — Matt Kim
*Assistant Examiner* — William Trapanese
(74) *Attorney, Agent, or Firm* — Fogg & Powers LLC

(57) ABSTRACT

An avionics messaging system comprises a memory configured to store a plurality of pre-defined avionics message elements; a display unit configured to display data; a user input device configured to receive input from a user; and a processing unit configured to output a user-customizable list of pre-defined avionics message elements to the display unit, the user-customizable list comprising at least a subset of the plurality of pre-defined avionics message elements; wherein the processing unit is further configured to update the user-customizable list based on input received from the user input device; wherein the processing unit is further configured to provide a message composition screen to the display unit based on user input received from the user input device; and wherein the message composition screen corresponds to a pre-defined avionics message element selected from the user-customizable list of pre-defined avionics message elements.

29 Claims, 6 Drawing Sheets

(56) References Cited

U.S. PATENT DOCUMENTS

| | | | |
|---|---|---|---|
| 7,359,703 B2 | 4/2008 | McGuffin et al. | |
| 7,698,326 B2 | 4/2010 | Thorn | |
| 7,912,706 B2 | 3/2011 | Sparre | |
| 2003/0006910 A1* | 1/2003 | Dame | 340/945 |
| 2003/0234821 A1 | 12/2003 | Pugliese | |
| 2004/0124998 A1 | 7/2004 | Dame | |
| 2004/0162648 A1* | 8/2004 | Bontrager et al. | 701/3 |
| 2005/0136954 A1* | 6/2005 | Itoh | 455/466 |
| 2006/0217851 A1 | 9/2006 | McGuffin et al. | |
| 2006/0265648 A1 | 11/2006 | Rainisto et al. | |
| 2006/0282790 A1 | 12/2006 | Matthews et al. | |
| 2007/0157111 A1 | 7/2007 | Lensky | |
| 2008/0163093 A1* | 7/2008 | Lorido | 715/771 |
| 2008/0168039 A1* | 7/2008 | Carpenter et al. | 707/3 |
| 2008/0184166 A1* | 7/2008 | Getson et al. | 715/810 |
| 2008/0276186 A1 | 11/2008 | Feduszczak et al. | |
| 2008/0310723 A1 | 12/2008 | Manu et al. | |
| 2009/0007009 A1* | 1/2009 | Luneau et al. | 715/808 |
| 2009/0036102 A1 | 2/2009 | Ho | |
| 2009/0077494 A1 | 3/2009 | Sjolin | |
| 2009/0192786 A1 | 7/2009 | Assadollahi | |
| 2009/0326794 A1 | 12/2009 | Lungwitz et al. | |
| 2010/0204855 A1* | 8/2010 | Vial | 701/14 |
| 2011/0106889 A1* | 5/2011 | Scott et al. | 709/206 |

OTHER PUBLICATIONS

Martin et al., "Authoring Collaborative Graphical Editors for Adaptive Context Based Learning Environments", "International Workshop on Representation Models and Techniques for Improving E-Learning: Bringing Context into Web-Based Education", Aug. 20, 2007, vol. 270, Publisher: ReTleL 2007, Published in: Denmark.

Penner et al, "DIGBE: Adaptive User Interface Automation", "AAAI Technical Report", 1999, vol. SS-00-01, Publisher: American Association for Artificial Intelligence.

"WordLogic Text Prediction Engine", "http://www.wordlogic.com/", 2010, Publisher: WordLogic Corporation.

* cited by examiner

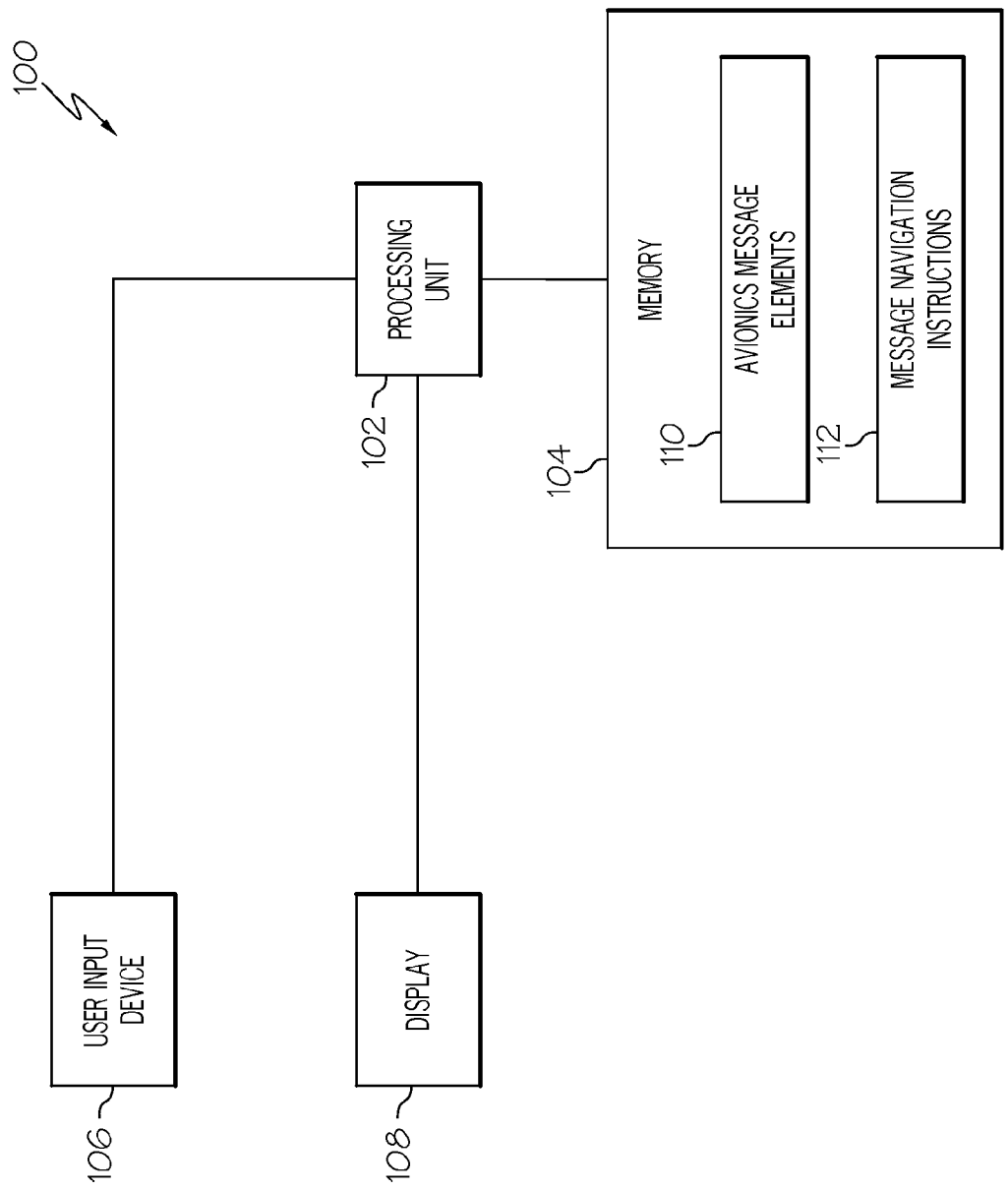

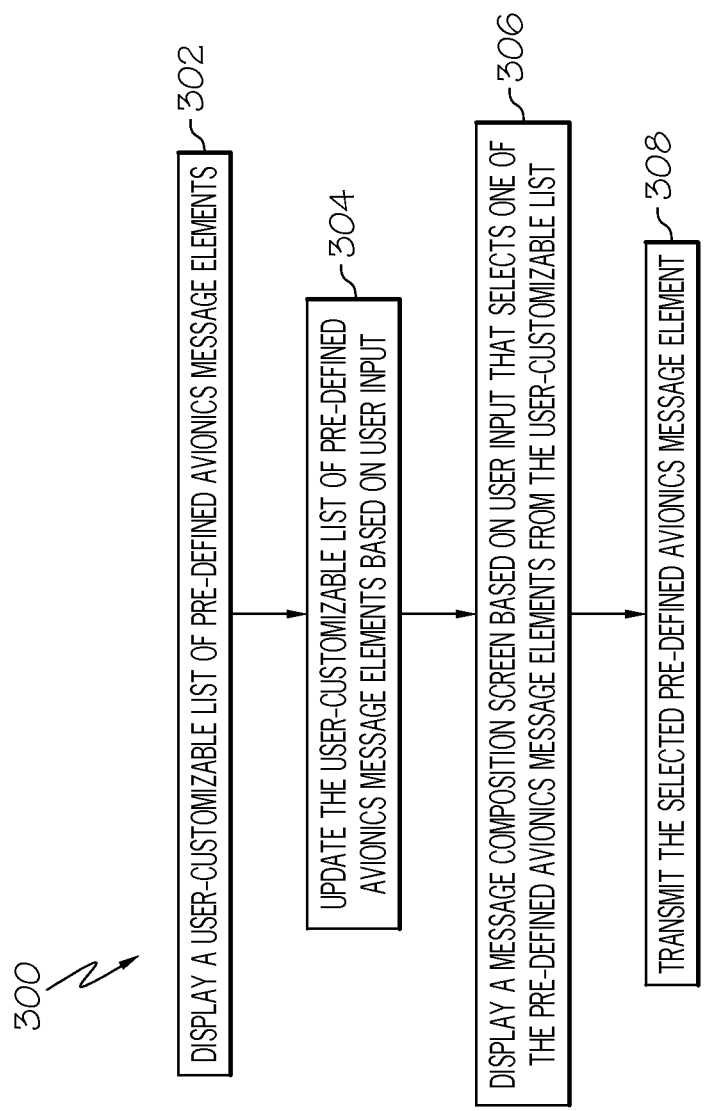

AVIONIC DATA DICTIONARY BASED MESSAGING SYSTEM AND METHOD

U.S. GOVERNMENT LICENSE RIGHTS

This invention was made with Government support under Government Contract No. DTFAWA-10-A-80003 awarded by the U.S. Federal Aviation Administration (FAA AWA). The Government has certain rights in the invention.

BACKGROUND

In flying an aircraft, pilots are often required to compose and send messages either to other systems on the aircraft or to systems on the ground. For example, pilots and air traffic controllers typically communicate using a communication system in which they compose messages consisting of pre-defined phrases or message elements. One typical human machine interface which is used to communicate these messages is the Multifunction Control and Display Unit (MCDU).

SUMMARY

In one embodiment an avionics messaging system is provided. The avionics messaging system comprises a memory configured to store a plurality of pre-defined avionics message elements; a display unit configured to display data; a user input device configured to receive input from a user; and a processing unit configured to output a user-customizable list of pre-defined avionics message elements to the display unit, the user-customizable list comprising at least a subset of the plurality of pre-defined avionics message elements; wherein the processing unit is further configured to update the user-customizable list based on input received from the user input device; wherein the processing unit is further configured to provide a message composition screen to the display unit based on user input received from the user input device; and wherein the message composition screen corresponds to a pre-defined avionics message element selected from the user-customizable list of pre-defined avionics message elements.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 is a block diagram of one embodiment of an avionics messaging system.

FIG. 3 is a flow chart of one embodiment of a method of communicating a pre-defined avionics message element.

Figure 2A:
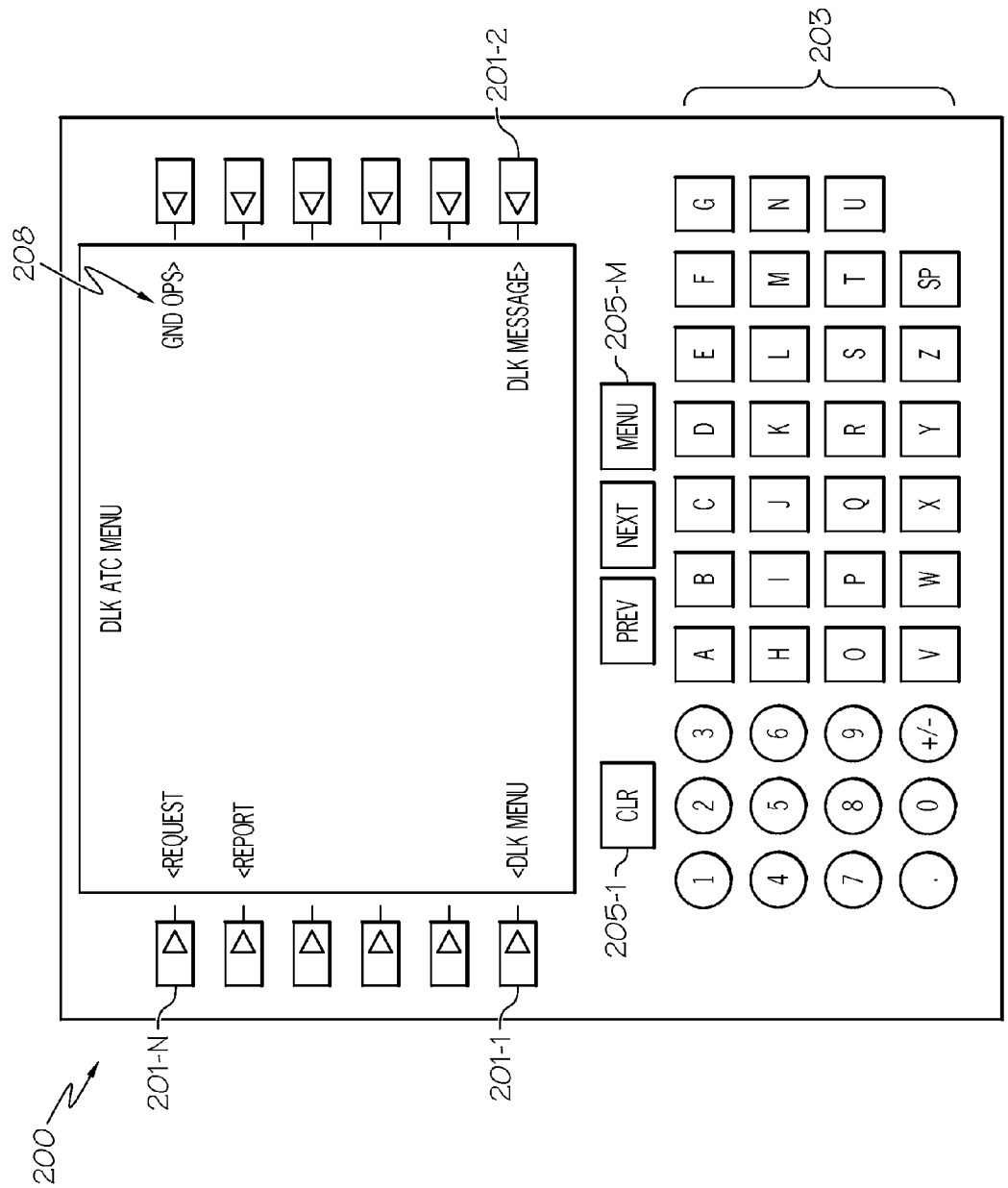
FIGS. 2A-2D are block diagrams of one embodiment of a human machine interface.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

The embodiments described herein reduce the burden placed on pilots to compose avionics messages. In particular, the embodiments described herein enable quick navigation to the desired message composition screens which reduces the amount of time required to navigate through the hierarchal menu structure of conventional avionics messaging systems.

FIG. 1 is a block diagram of one embodiment of an avionics messaging system 100. Avionics messaging system 100 includes a processing unit 102, a memory 104, a user input device 106, and a display 108. It is to be understood that each of the elements of system 100 can be implemented in separate devices. For example, in some embodiments, the processing unit 102 and memory 104 are implemented in a Communication Management Unit (CMU) or Flight Management Computer (FMC) whereas the display 108 and user input device 106 are implemented in a Human-Machine Interface (HMI) such as a Multifunction Control and Display Unit (MCDU) or Multi-input Interactive Display Unit (MIDU) coupled to the CMU or FMC. Additionally, as used herein, an avionics message is defined as a message that is communicated from a device onboard an aircraft to either another device onboard the aircraft or to a device located off of the aircraft. For example, in some embodiments, system 100 is used for transmission of Controller Pilot Data Link Communications (CPDLC) messages to exchange communication between an Air Traffic Control (ATC) and a pilot. The terms "Avionics message", "pre-defined avionics message element", and "pre-defined message element" are used interchangeably herein.

The processing unit 102 includes or functions with software programs, firmware or other computer readable instructions for carrying out various methods, process tasks, calculations, and control functions, used in providing avionics message screens to a user and transmitting the user selected messages as described herein.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. For example, in the embodiment shown in FIG. 1, message navigation instructions 112 are stored on memory 104 and executed by the processing unit 102.

Also stored on memory 104 is a plurality of pre-defined avionics message elements 110. Thus, the avionics system 100 is a data dictionary based messaging system. The pre-defined avionics message elements 110 can be determined by a standards organization or a regulatory agency. For example, the Federal Aviation Administration (FAA) has defined over 150 CPDLC message elements for use on aircraft flying within the United States of America. The FAA will also likely add additional pre-defined message elements in the future. Similarly, Eurocontrol, the European Organization for the Safety of Air Navigation, has defined a plurality of pre-defined CPDLC message elements for the Link2000+ program used in Europe and will continue to add message elements in the future. Either or both of these exemplary message elements can be stored as pre-defined message elements 110 on memory 104. In addition, other pre-defined message elements can be stored on memory 110 in some embodiments. It should also be noted that, although message navigation instructions 112 and pre-defined avionics message elements 110 are depicted in FIG. 1 as being stored on the same memory 104, each can be stored on a separate memory device in other embodiments.

To aid a pilot in composing a message comprised of one or more of the pre-defined message elements 110, the processing unit 102 instructs the display 108 to display an option for selecting a message navigation screen. For example, the exemplary MCDU 200 of FIG. 2A displays an option entitled "DLK MESSAGE." The exemplary MCDU 200 includes pre-defined function buttons 205-1 . . . 205-M, action buttons 201-1 . . . 201-N, and alpha-numeric keypad 203. In addition, the MCDU 200 includes display 208. In some embodiments, the display 208 uses touch-screen technology for user input, as known to one of skill in the art. In some such embodiments, the pre-defined buttons 205-1 . . . 205-M, action buttons 201-1 . . . 201-N, and/or alpha-numeric keypad 203 are implemented as buttons on the touch-screen technology rather than as buttons separate from the display 208.

The pre-defined function buttons 205-1 . . . 205-M are buttons which are permanently associated with a particular functionality, such as moving to the next or previous page, displaying a menu, etc. Action buttons 201-1 . . . 201-N are buttons which are associated with different functions depending on the message or information displayed on the display 208. For example, in the embodiment shown in FIG. 2A, the display 208 presents the text "DLK MESSAGE" next to action button 201-2. Upon pressing the action button 201-2, the message navigation screen is displayed. Action button 201-2 is, thus, temporarily associated with the function of selecting the message navigation screen. After selection of the message navigation screen, the action button 201-2 may be associated with a different function for a different screen.

Figure 2B:
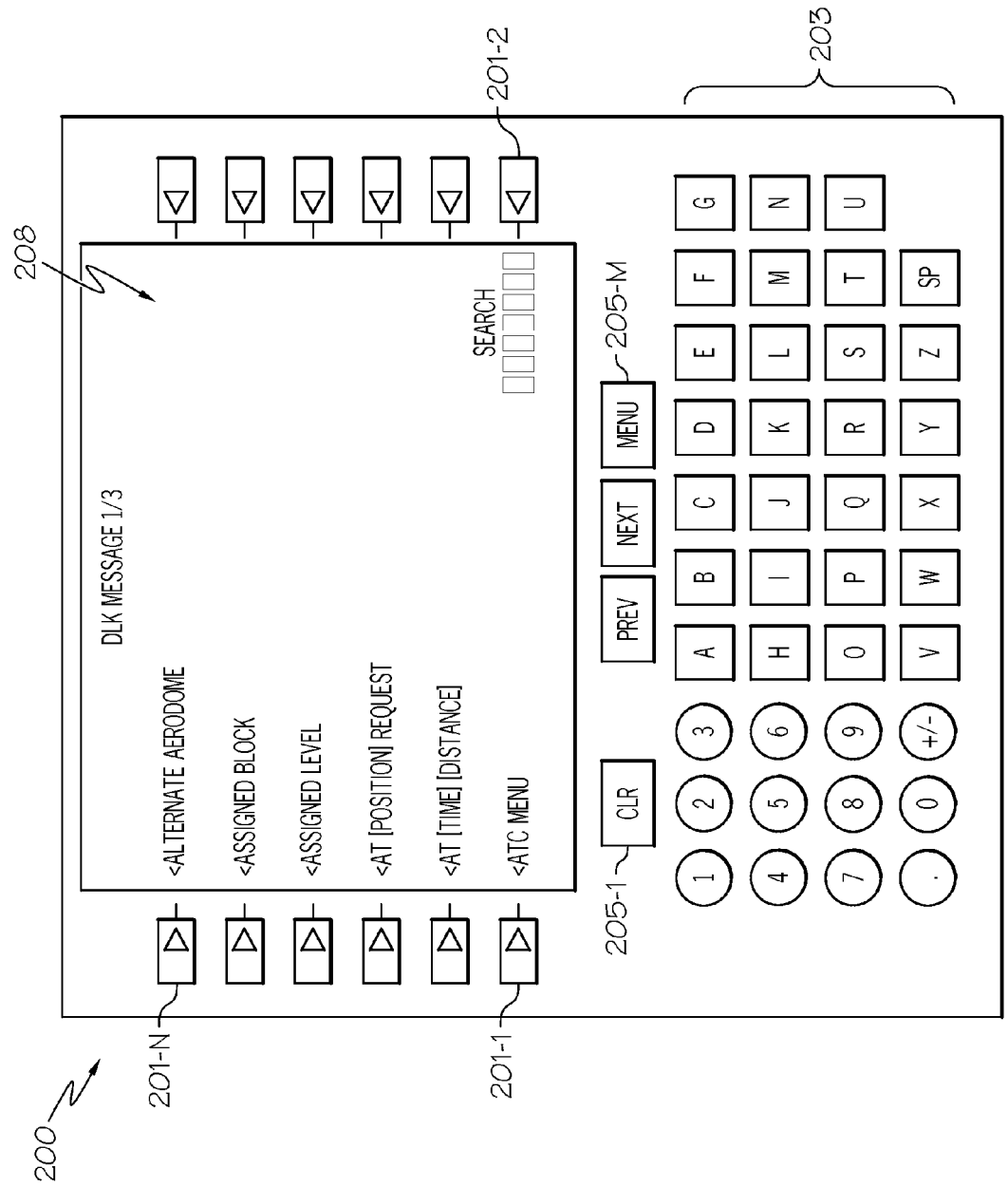

An exemplary message navigation screen is shown in FIG. 2B. The message navigation screen displays a user-customizable list of pre-defined avionics message elements. As used herein, the term "user-customizable list" is defined to mean a list that is updated or changed at run-time during operation of the system based on user input received via the user input device 106. For example, as described in more detail below, the user-customizable list can be updated by user input to change the sort order of the list and by user input to change the contents of the list. This also includes changing the content of a list of most recently used message elements based on user input that selected the pre-defined message elements.

In the embodiment shown in FIG. 2A, when the message navigation screen is loaded, a list of all of the available pre-defined message elements 110 is displayed. If all of the pre-defined message elements do not fit on the display 208, pre-defined function buttons 205 for navigating through multiple pages of pre-defined message elements can be used, such as "PREV" and "NEXT" shown in FIGS. 2A-2D. Furthermore, in this exemplary embodiment, the pre-defined message elements 110 are sorted in alphabetical order. However, in other embodiments, the pre-defined message elements 110 are sorted based on other criteria, such as, but not limited to, frequency of use and how recently each pre-defined message element has been used. For example, the most recent message elements are shown first in some embodiments.

Additionally, in other embodiments, a subset of the total number of pre-defined message elements is displayed on display 208 when the message navigation screen is loaded. For example, in some embodiments, only the most recently used messages are displayed. In other embodiments, the sub-set of pre-defined message elements is determined based on the flight phase of the aircraft. For example, in some such embodiments, a first subset of pre-defined messages is displayed when the aircraft is on the ground and a second subset of pre-defined messages is displayed when the aircraft is in the air. In other embodiments, the sub-set of pre-defined message elements is determined based on the location of the aircraft. For example, in some embodiments, only pre-defined message elements defined by the FAA are displayed when the aircraft is flying within or near the United States. When the aircraft is flying within or near Europe, in such embodiments, only pre-defined message elements defined by Eurocontrol are displayed.

Furthermore, combinations of the above criteria are also used in some implementations. For example, the first subset of pre-defined message when the aircraft is on the ground can be sorted by frequency of use. Similarly, the second subset of pre-defined messages can be sorted by frequency of use. Additionally, in some embodiments, options are displayed on display 208 to enable the pilot to change the sort criteria used to sort the displayed pre-defined message elements. For example, an action button 201 can be associated with frequency of use, whereas another action button 201 can be associated with displaying the list in reverse alphabetical order.

Notably, action button 201-2, in this exemplary embodiment, is associated with a search function on the message navigation screen. In particular, the pilot is able to enter a search term to further refine the list of pre-defined message elements displayed on display 208. In some implementations, a full word is entered as a search term. For example, if the word "altitude" is entered, only the pre-defined message elements containing the word "altitude" are displayed after pressing the action button 201-2. The alpha-numeric key pad 203 can be used to enter the search term. In other implementations, a single character, partial words, full/complete words, or two or more initials can be entered as search terms. For example, if the single character "A" is entered, only pre-defined message elements beginning with the letter "A" are displayed. Similarly, if a partial word, such as "REQ" is input as the search term, only the pre-defined message elements beginning with "REQ" are displayed.

Alternatively, two or more initials are entered as a search term. The initials are separated by a special character or delimiter. For example, in some embodiments, a space is the delimiter between the initials. In other implementations, other special characters such as an asterisk "*" or forward slash "/" are used as the delimiter. The processing unit 102 searches for pre-defined message elements that have two or more words with the first letter of each of the two or more words matching a respective one of the two or more characters in the search term. In other words, the processing unit 102 searches for pre-defined message elements that have a first word that starts with the first initial and a second word that starts with the second initial and so forth. For example, if the search term "R V" is entered, all of the pre-defined message elements which have a first word beginning with "R" and a second word beginning with "V" are displayed. However, if the search term "R V C" is entered, only the pre-defined message elements having a first word that begins with "R", a second word that begins with "V", and a third word beginning with "C" are displayed.

As described above, after entering the search term using the alpha-numeric keypad 203, a pilot presses the action button 201 associated with the search. In the example shown in FIG. 2B action button 201-2 is associated with the search. Thus, after pressing the action button 201-2, the processing unit 102 performs the search of pre-defined message elements based on the input search term. The processing unit 102 then provides the results to the display 208 for display to the user. Alternatively, in other implementations, the message navigation instructions are configured to cause the processing unit 102 to update the search results after each character of the search term is input. In other words, after the first character is input, the list of pre-defined elements is updated automatically without requiring the pilot to press the action button 201-2. As additional characters are input, the list is dynamically updated. For example, after entering the letter "A" the list is updated to display all pre-defined message elements beginning with the letter "A". Then after entering the letter "T", the list is updated to display all pre-defined message elements beginning with "AT".

Figure 2C:
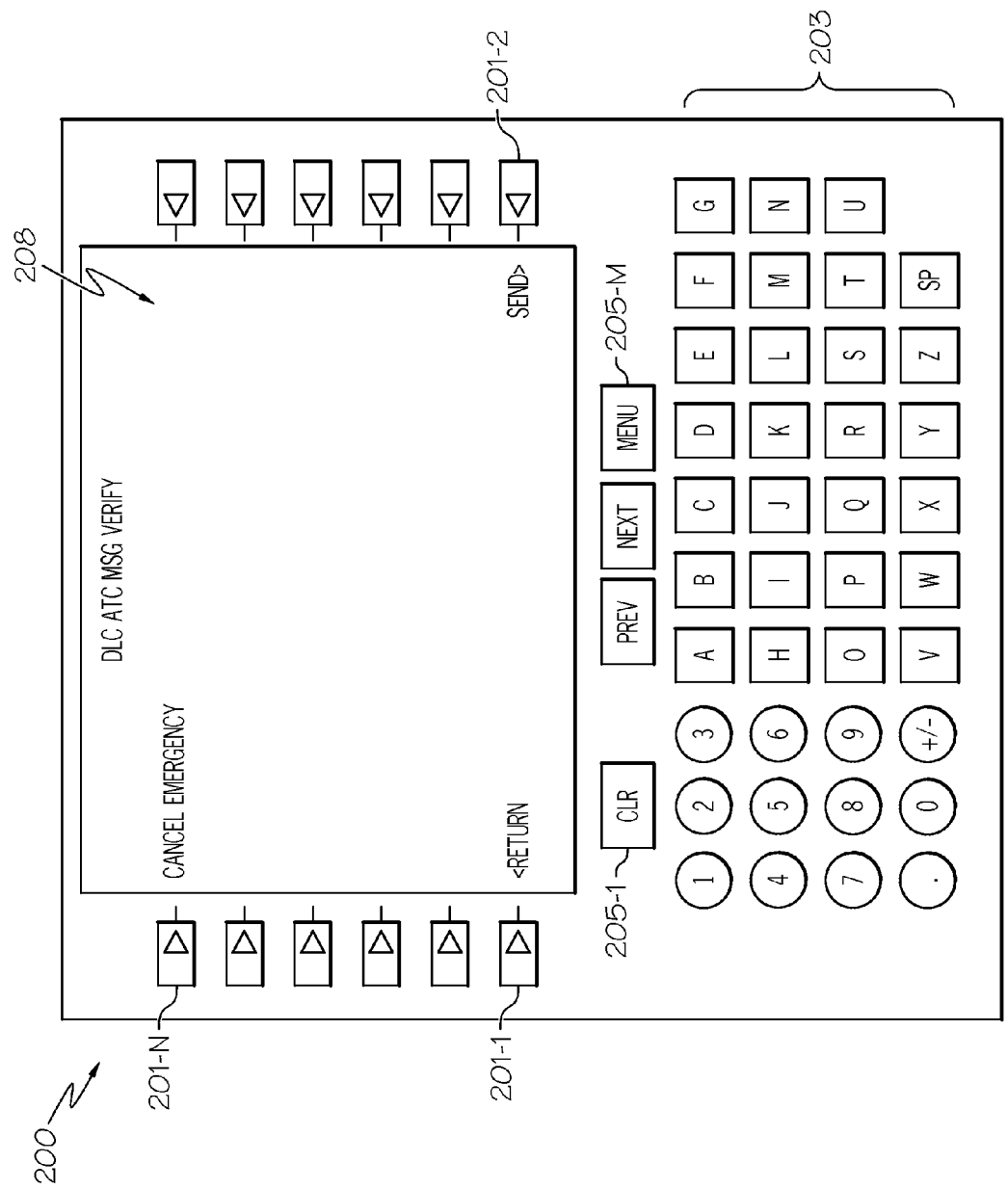
Figure 2D:
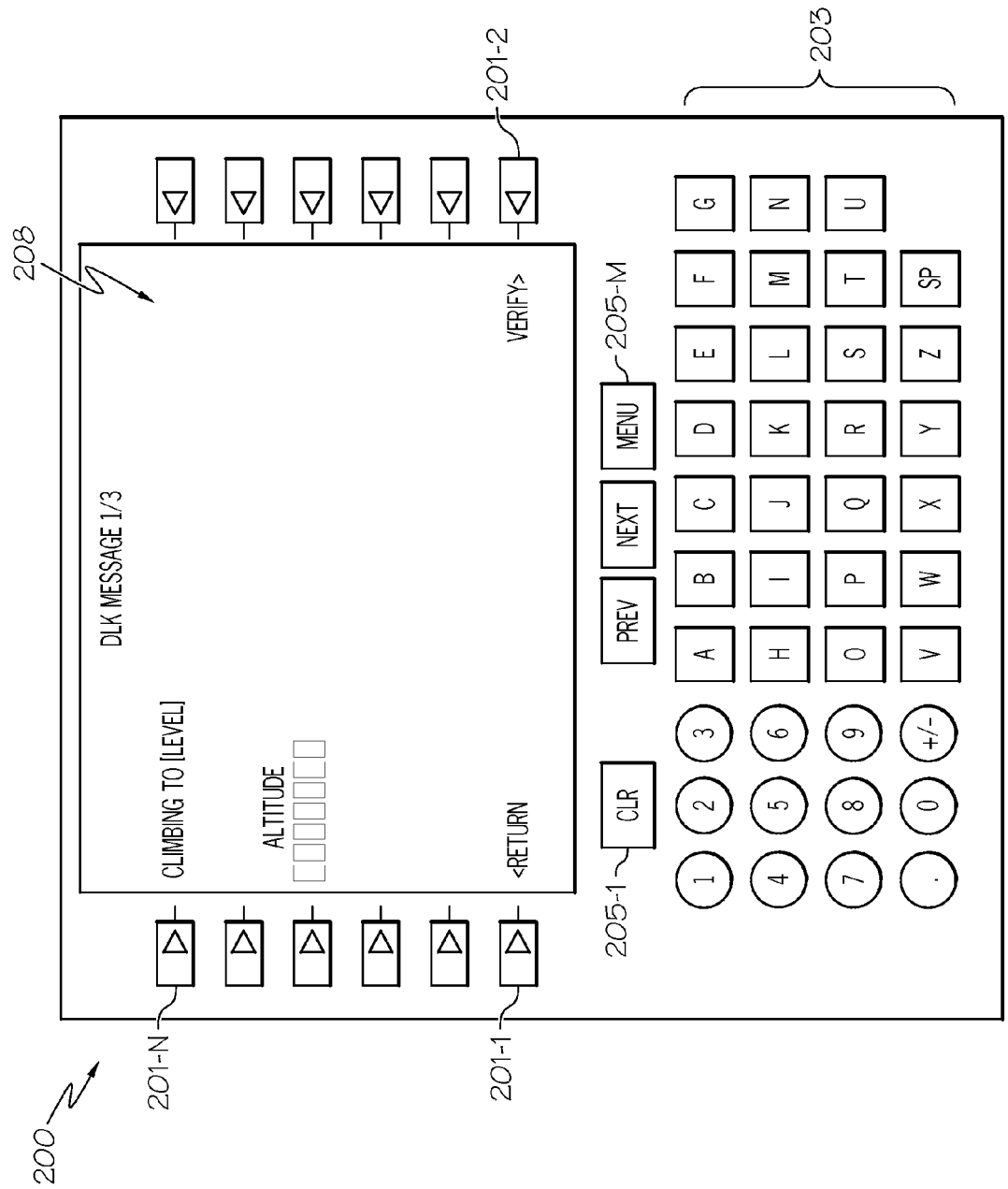

From the message navigation screen, a pilot can select from the list of pre-defined message elements to compose a message by pressing the action button 201 associated with the selected pre-defined message element. After pressing the associated action button 201, the processing unit 102 causes the message composition screen corresponding to the selected message element to be displayed. As used herein, a message composition screen is defined as a screen from which the user can enter addition information related to the message and/or cause the message comprising the selected pre-defined message element to be sent. Exemplary message composition screens are shown in FIGS. 2C and 2D. In particular, FIG. 2C depicts an exemplary message composition screen which does not require additional pilot input. Thus, an action button 201 (action button 201-2 in this example) is associated with the command to send the pre-defined message element. The exemplary message composition screen depicted in FIG. 2D requests input from the pilot prior to sending the message. For example, in the example in FIG. 2D, the pilot enters the altitude and then selects the action button 201 associated with the "VERIFY" command. The pilot is then able to send the message after verifying the user input data.

Thus, the system 100 avoids the multiple levels of navigation through a hierarchal menu structure of typical avionics messaging systems. Thus, the embodiments described herein reduce the burden on a pilot to compose and send messages. Additionally, the time required to compose a message is also reduced as compared to the time required to navigate through a hierarchal menu structure.

It is to be understood that the MCDU 200 depicted in FIGS. 2A-2D is provided by way of example and not by way of limitation. In particular, in other embodiments, other human-machine interface devices are used. In addition, the specific layout of the action buttons 201-1 . . . 201-N, the pre-defined function buttons 205-1 . . . 205-M, and the alpha-numeric keypad 203 can be implemented in various configurations and the layout is not limited to the layout depicted in the exemplary embodiment shown in FIGS. 2A-2D. Additionally, the exemplary pre-defined message elements discussed above and shown in FIGS. 2A-2D are provided by way of example.

It is to be understood that system 100 is not limited to CPDLC messages and that other CPDLC pre-defined message elements are included in various embodiments. Furthermore, the labels displayed on the display of MCDU 200 are also provided by way of example. For example, the titles "DLK MESSAGE", "DLK ATC MENU", etc. can be replaced with other labels in other embodiments.

FIG. 3 is a flow chart depicting an exemplary method 300 of communicating a pre-defined avionics message element. Method 300 can be implemented with an avionics messaging system such as avionics messaging system 100 described above. At block 302, a user-customizable list of pre-defined avionics message elements is displayed. For example, the user-customizable list can be displayed in response to user-input selecting display of the user-customizable list. At 304, the user-customizable list is updated based on user input. For example, user input can be used to update the order in which the pre-defined avionics message elements are sorted in the user-customizable list. Additionally, user input can be used to update the contents of the user-customizable list as described above.

At block 306, a message composition screen is displayed in response to user input. The displayed message composition screen corresponds to a pre-defined message element selected from the user-customizable list. The message composition screen is a screen used to complete and or send the message comprised of the corresponding pre-defined message element, as described above. Thus, the embodiments described herein avoid the multiple levels of hierarchal menu structure by going directly from the user-customizable list to the message composition screen. At block 308, the message is transmitted in response to user input.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An avionics messaging system comprising:
   a memory configured to store a plurality of pre-defined avionics message elements, wherein each of the pre-defined avionics message elements is a message element for communication from the avionics messaging system to another device;
   a display unit configured to display data;
   a user input device configured to receive input from a user; and
   a processing unit configured to output a user-customizable list of pre-defined avionics message elements to the display unit for display on the display unit, the user-customizable list comprising at least a subset of the plurality of pre-defined avionics message elements;
   wherein the user-customizable list does not comprise a hierarchal menu structure and the user-customizable list is displayed in response to user input selecting the user-customizable list for display;
   wherein the processing unit is further configured to select the pre-defined avionics message elements included in the user-customizable list displayed on the display unit based on input criteria received from the user input device;
   wherein the processing unit is further configured to provide a message composition screen to the display unit based on user input received from the user input device; and wherein the message composition screen corresponds to a pre-defined avionics message element selected from the user-customizable list of pre-defined avionics message elements displayed on the display unit.

2. The avionics messaging system of claim 1, wherein upon initial display of the user-customizable list, the user-customizable list contains the pre-defined avionics message elements that have been used previously within a pre-determined time frame.

3. The avionics messaging system of claim 1, wherein the processing unit is configured to determine which of the plurality of pre-defined avionics message elements to include in the user-customizable list based, at least in part, on one or more of the location of the aircraft and the flight phase of the aircraft.

4. The avionics messaging system of claim 1, wherein upon initial display of the user-customizable list, the processing unit is configured to sort the user-customizable list of pre-defined avionics message elements based on one of alphabetical order, frequency of use of each of the pre-defined avionics message elements, and recency of use of each of the pre-defined avionics message elements;

wherein the processing unit is configured to update the user-customizable list by re-sorting the user-customizable list of pre-defined avionics message elements based on user input received from the user input device.

5. The avionics messaging system of claim 1, wherein the processing unit is configured to update the user-customizable list to display only pre-defined avionics message elements that correspond to a user input search term received from the user input device.

6. The avionics messaging system of claim 5, wherein the user input search term comprises one of a single character, a partial word, and a complete word.

7. The avionics messaging system of claim 5, wherein the user input search term comprises two or more characters separated from each other by a delimiter; and wherein the processing unit is configured to update the user-customizable list to display only pre-defined avionics message elements having two or more words, the first letter of each of the two or more words matching a respective one of the two or more characters in the search term.

8. A program product comprising a non-transitory processor-readable medium on which program instructions are embodied, wherein the program instructions are configured, when executed by at least one programmable processor, to cause the at least one programmable processor:

to determine which of a plurality of pre-defined avionics message elements to include in a user-customizable list of pre-defined avionics message elements, the plurality of pre-defined avionics message elements stored in a memory coupled to the at least one programmable processor, wherein each of the pre-defined avionics message elements is a message element for communication from the avionics messaging system to another device;

to provide the user-customizable list of pre-defined avionics message elements to a display unit coupled to the at least one programmable processor for display on the display unit in response to user input selecting the user-customizable list for display; wherein the user-customizable list does not comprise a hierarchal menu structure;

to select the pre-defined avionics message elements included in the user-customizable list of pre-defined avionics message elements displayed on the display unit based on user input criteria received from a user input device coupled to the at least one programmable processor; and upon receipt of user input selecting one of the pre-defined avionics message elements from the user-customizable list displayed on the display unit, to provide a message composition screen to the display unit for display on the display unit, the message composition screen corresponding to the selected pre-defined avionics message element.

9. The computer program product of claim 8, wherein the program instructions are further configured to cause the at least on programmable processor to determine which of the plurality of pre-defined avionics message elements to include in the user-customizable list based, at least in part, on one or more of the location of the aircraft and the flight phase of the aircraft.

10. The computer program product of claim 8, wherein the program instructions are further configured to cause the at least one programmable processor, in the absence of user input, to include in the user-customizable list only the pre-defined avionics message elements that have been used previously within a pre-determined time frame.

11. The computer program product of claim 8, wherein the program instructions are further configured cause the at least one programmable processor to sort the user-customizable list of pre-defined avionics message elements based on one of alphabetical order, frequency of use of each of the pre-defined avionics message elements, and recency of use of each of the pre-defined avionics message elements.

12. The computer program product of claim 8, wherein the program instructions are further configured cause the at least one programmable processor to update the user-customizable list to display only pre-defined avionics message elements that correspond to a user input search term received from the user input device.

13. The computer program product of claim 12, wherein the user input search term comprises two or more characters separated from each other by a delimiter; and wherein the program instructions are further configured to cause the at least one programmable processor to update the user-customizable list to display only pre-defined avionics message elements having two or more words, the first letter of each of the two or more words matching a respective one of the two or more characters in the search term.

14. The computer program product of claim 8, wherein the program instructions are further configured to cause the at least one programmable processor to re-sort the user-customizable list of pre-defined avionics message elements based on user input received from the user input device.

15. A method of communicating a pre-defined avionics message element, the method comprising:

displaying a user-customizable list of pre-defined avionics message elements in response to user input selecting the user-customizable list for display; wherein the user-customizable list comprises a single level;

selecting the pre-defined avionics message elements included in the user-customizable list of pre-defined avionics message elements based on user input criteria;

displaying a message composition screen based on user input that selects one of the pre-defined avionics message elements from the user-customizable list; the message composition screen corresponding to the selected pre-defined avionics message element; and transmitting the selected pre-defined avionics message element based on user input.

16. The method of claim 15, wherein displaying the user-customizable list comprises displaying a user-customizable list of pre-defined avionics message elements that have been used previously within a pre-determined time frame.

17. The method of claim 15, wherein displaying the user-customizable list comprises determining which of the plurality of pre-defined avionics message elements to include in the user-customizable list based, at least in part, on one or more of the location of the aircraft and the flight phase of the aircraft.

18. The method of claim 15, wherein updating the user-customizable list comprises sorting the user-customizable list based on one of alphabetical order, frequency of use of each of the pre-defined avionics message elements, and recency of use of each of the pre-defined avionics message elements.

19. The method of claim 15, wherein updating the user-customizable list comprises displaying only pre-defined avionics message elements that correspond to a user input search term.

20. The method of claim 16, wherein the user input search term comprises two or more characters separated from each other by a delimiter; and wherein displaying only pre-defined avionics message elements that correspond to a user input search term comprises displaying only pre-defined avionics message elements having two or more words, the first letter of each of the two or more words matching a respective one of the two or more characters in the search term.

21. An avionics messaging system in an aircraft comprising:
a memory configured to store a plurality of pre-defined avionics message elements, wherein each of the pre-defined avionics message elements is a message element for communication from the avionics messaging system to another device;
a display unit configured to display data;
a user input device configured to receive input from a user; and
a processing unit configured to output a customizable list of pre-defined avionics message elements to the display unit for display on the display unit in response to user input selecting the customizable list for display, the customizable list comprising at least a subset of the plurality of pre-defined avionics message elements;
wherein the customizable list does not comprise a hierarchal menu structure or drop-down list;
wherein the processing unit is further configured to update the customizable list displayed on the display unit based on the flight phase of the aircraft;
wherein the processing unit is further configured to provide a message composition screen to the display unit based on user input received from the user input device; and
wherein the message composition screen corresponds to a pre-defined avionics message element selected from the customizable list of pre-defined avionics message elements displayed on the display unit.

22. The avionics messaging system of claim 21, wherein, upon initial display of the customizable list, the processing unit is configured to sort the customizable list of pre-defined avionics message elements based on frequency of use of each of the pre-defined avionics message elements or how recently each of the pre-defined avionics message elements was used.

23. The avionics messaging system of claim 21, wherein the processing unit is configured to update the customizable list to display only pre-defined avionics message elements that correspond to a user input search term received from the user input device.

24. A program product comprising a non-transitory processor-readable medium on which program instructions are embodied, wherein the program instructions are configured, when executed by at least one programmable processor, to cause the at least one programmable processor:
to determine which of a plurality of pre-defined avionics message elements to include in a customizable list of pre-defined avionics message elements based on flight phase, the plurality of pre-defined avionics message elements stored in a memory coupled to the at least one programmable processor, wherein each of the pre-defined avionics message elements is a message element for communication from the avionics messaging system to another device;
to provide the customizable list of pre-defined avionics message elements to a display unit coupled to the at least one programmable processor for display on the display unit in response to user input selecting the customizable list for display; wherein the customizable list does not comprise a hierarchal menu structure or drop-down list; and
upon receipt of user input selecting one of the pre-defined avionics message elements from the customizable list displayed on the display unit, to provide a message composition screen to the display unit for display on the display unit, the message composition screen corresponding to the selected pre-defined avionics message element.

25. The computer program product of claim 24, wherein the program instructions are further configured cause the at least one programmable processor to sort the customizable list, upon initial display of the customizable list, based on frequency of use of each of the pre-defined avionics message elements or how recently each of the pre-defined avionics message elements was used.

26. The computer program product of claim 24, wherein the program instructions are further configured cause the at least one programmable processor to update the customizable list to display only pre-defined avionics message elements that correspond to a user input search term.

27. A method of communicating a pre-defined avionics message element, the method comprising:
displaying a customizable list of pre-defined avionics message elements on a text-only display based on flight phase of an aircraft in response to user input selecting the customizable list for display; wherein the customizable list comprises a single level;
displaying a message composition screen based on user input that selects one of the pre-defined avionics message elements from the customizable list; the message composition screen corresponding to the selected pre-defined avionics message element; and
transmitting the selected pre-defined avionics message element based on user input.

28. The method of claim 27, further comprising updating the customizable list to display only pre-defined avionics message elements that correspond to a user input search term.

29. The method of claim 27, wherein displaying the customizable list comprises sorting the customizable list, upon initial display of the customizable list, based on frequency of use of each of the pre-defined avionics message elements or how recently each of the pre-defined avionics message elements was used.

* * * * *